United States Patent
Cheng et al.

(10) Patent No.: US 10,211,623 B2
(45) Date of Patent: Feb. 19, 2019

(54) POWER SUPPLY CONTROL

(71) Applicant: ETON SOLUTIONS LIMITED, Hong Kong (CN)

(72) Inventors: Ka Wai Eric Cheng, Hong Kong (CN); Man Yau Law, Hong Kong (CN); Hin Hung Ng, Hong Kong (CN)

(73) Assignee: Eton Solutions Limited, Hong Kong (CN)

( * ) Notice: Subject to any disclaimer, the term of this patent is extended or adjusted under 35 U.S.C. 154(b) by 0 days.

(21) Appl. No.: 15/570,680

(22) PCT Filed: May 2, 2016

(86) PCT No.: PCT/IB2016/052474
§ 371 (c)(1),
(2) Date: Oct. 30, 2017

(87) PCT Pub. No.: WO2016/174644
PCT Pub. Date: Nov. 3, 2016

(65) Prior Publication Data
US 2018/0152015 A1 May 31, 2018

(30) Foreign Application Priority Data

Apr. 30, 2015 (HK) .................................. 15104207

(51) Int. Cl.
*H02H 5/12* (2006.01)
*G05B 9/02* (2006.01)
(Continued)

(52) U.S. Cl.
CPC ................ *H02H 5/12* (2013.01); *G05B 9/02* (2013.01); *H02J 3/14* (2013.01); *H02J 2003/143* (2013.01);
(Continued)

(58) Field of Classification Search
CPC ........ H02H 5/12; H02J 3/14; H02J 2003/143; H02J 2007/0001; Y02B 70/3266; Y04S 20/242; G05B 9/02
See application file for complete search history.

(56) References Cited

U.S. PATENT DOCUMENTS

| 5,003,486 A | 3/1991 | Hendel et al. |
| 8,471,415 B1 | 6/2013 | Heninwolf |

(Continued)

FOREIGN PATENT DOCUMENTS

| CN | 201584818 | 9/2010 |
| CN | 103296540 | 9/2013 |
| CN | 203859336 | 10/2014 |

OTHER PUBLICATIONS

International Search Report for PCT/IB2016/052474 dated Sep. 5, 2016.
(Continued)

*Primary Examiner* — Robert Deberadinis
(74) *Attorney, Agent, or Firm* — Nixon Peabody LLP; Jeffrey L. Costellia (57) ABSTRACT

A power supply control device comprises a controller and power connection circuitry. The power connection circuitry comprises a switchable power connection path between a source side and a load side. The power connection path is switchable to operate in a first operation state or an on-state in which state impedance between the source side and the load side is very low to permit flow of operation current through the power connection path, or a second operation state or an off-state in which state impedance between the source side and the load side is very high to impede flow of operation current through the power connection path. The controller is to operate to transmit at least one type of enquiry signals to the load side and to determine with reference to at least one type of received responsive signals
(Continued)

whether a load on the load side is eligible for power supply connection. The controller is to switch the power connection path to the on-state or to maintain the power connection path to the on-state if the responsive signals indicate eligibility for power supply connection.

20 Claims, 4 Drawing Sheets

(51) Int. Cl.
      *H02J 3/14*     (2006.01)
      *H02J 7/00*     (2006.01)

(52) U.S. Cl.
      CPC ... *H02J 2007/0001* (2013.01); *Y02B 70/3266* (2013.01); *Y04S 20/242* (2013.01)

(56) References Cited

U.S. PATENT DOCUMENTS

2006/0120008 A1    6/2006   Kreiner
2010/0283577 A1   11/2010   Koch

OTHER PUBLICATIONS

European Extended Search Report (Application No. EP16786057.6) dated Apr. 18, 2018.

POWER SUPPLY CONTROL

FIELD

The present disclosure relates to power supply control.

BACKGROUND

Electricity is used to power a lot of tools, equipment, apparatus and appliance It is desirable if the supply of power can have enhanced features to mitigate unauthorised use of or hazardous operations.

DISCLOSURE

A power supply control device comprises a controller and power connection circuitry. The power connection circuitry comprises a switchable power connection path between a source side and a load side. The power connection path is switchable to operate in a first operation state or an on-state in which state impedance between the source side and the load side is very low to permit flow of operation current through the power connection path, or a second operation state or an off-state in which state impedance between the source side and the load side is very high to impede flow of operation current through the power connection path The controller is to operate to transmit at least one type of enquiry signals to the load side and to determine with reference to at least one type of received responsive signals whether a load on the load side is eligible for power supply connection. The controller is to switch the power connection path to the on-state or to maintain the power connection path to the on-state if the responsive signals indicate eligibility for power supply connection.

A method of supplying power from a source side to a load side. The method comprises: transmitting at least one type of enquiry signals or probing signals to the load side, determining from at least one type of responsive signals from the load side whether a target load or a non-hazardous load is on the load side, switching on power supply to the on-state or maintaining power supply to the load if the responsive signals indicate connection of a target device or connection, connection of un-acceptable load, connection of non-hazardous load on the load side.

FIGURES

Example and example embodiments will be described with reference to the accompanying Figures in which FIG. 2A1 is an example hybrid block and circuit diagram of an example implementation of the power supply control device of FIG. 2A.

DESCRIPTION

Figure 1:
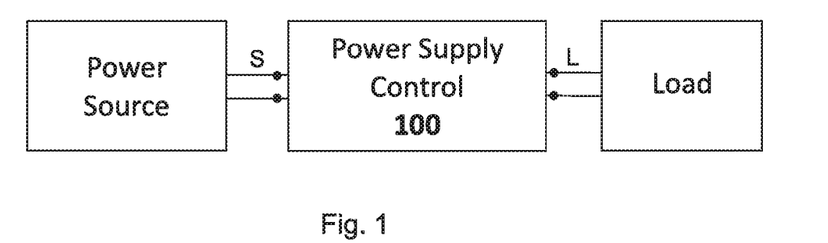
FIG. 1 is a block diagram of an example electrical system comprising a power supply control device of the present disclosure.

An example power supply control device 100 includes a first device side (or a source side S) which is for connection to a power source and a second device side (or a load side L) which is for connection to an electrical load, as depicted in FIG. 1.

Figure 1A:
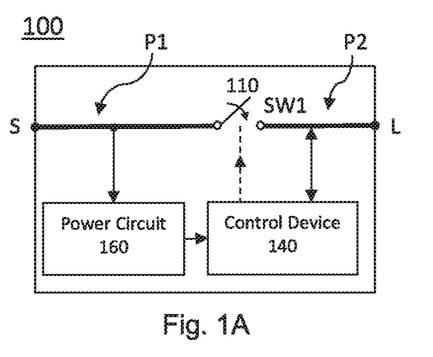
FIG. 1A is a block diagram of an example a power supply control device of the present disclosure.

The power supply control device 100 comprises a switching circuitry 110, a control device 140, a power connection circuitry and a power circuit 160, as depicted in FIG. 1A.

The power connection circuitry includes a first current conduction portion P1 which is connected to the first device side S, a second current conduction portion P2 which is connected to the second device side L, and a power switching device SW1 which is intermediate or which interconnects the first P1 and the second P2 current conduction portions. The power switching device SW1 is switchable between a first operation state of very low impedance and a second operation state of very high impedance. When the power switching device SW1 is in the very low impedance first operation state (or "ON state"), a very low impedance current conduction path is established between the first device side S and the second device side L. This current conduction path is to facilitate flow of operation current or operation power between the first device side S and the second device side L and forms a power connection path. When in this ON state, the first device side S and the second device side L are operationally connected for load operation, and operational current or operational power will flow through the power supply control device 100. When the power switching device SW1 is in the very high impedance second operation state (or "OFF state"), there is very high impedance between the first device side S and the second device side L. When in this OFF state, the first device side S and the second device side L are operationally disconnected, flow of operational current between the first device side S and the second device side L will be impeded. Where there is a current flow across the power supply control device 100 during this OFF-state, the current will be limited by the very high OFF-state impedance of the power switching device SW1 and the current will be limited to a non-operational load current or a non-hazardous current which is negligible and/or below a safety limit. An operational load current herein means a current of a magnitude which is intended or designated for a specific or designated load. For an electrical load, the operational load current may be the rated current or rated operation current of the load. The term "ON state" is interchangeably used with the terms "ON-state", "on state", "on-state", "closed state" and the term "OFF state" is interchangeably used with the terms "OFF-state", "off state", "off-state" or "open state" herein.

Figure 1B:
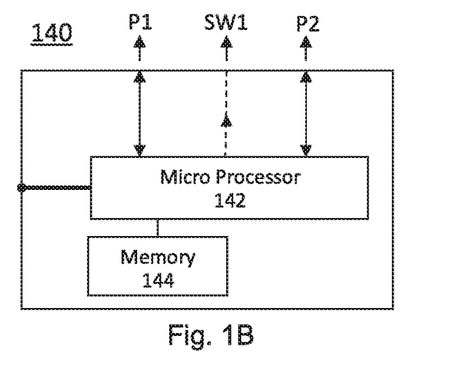
FIG. 1B is a block diagram of an example control device of the power supply control device of FIG. 1A.

The control device 140 comprises a controller 142 and a memory device 144, as depicted in FIG. 1B. The controller 142 is to operate to control switching operations of the power switching device SW1 and the memory device 144 is for storing data and instructions for use by the controller 142. The controller 142 may be a processor, a microprocessor or a microcontroller which is to execute stored instructions to operate to switch the path interconnecting the source side S and the load side L from a very high impedance off-state to a very low impedance on-state and vice versa. The controller 142 comprises a plurality of control ports, data output ports and data output ports.

In example embodiments, the power supply control device 100 is operable in a 'standby mode' or a 'power supply mode'. When in the standby mode, the power switching device SW1 is in the off-state and the first current conduction portion P1 and the second current conduction portion P2 form a non-conductive path in so far as operation current is concerned. When in the power supply mode, the power switching device SW1 is in the on-state and the first current conduction portion P1 and the second current conduction portion P2 form a conductive path in so far as operation current is concerned.

Figure 1C:
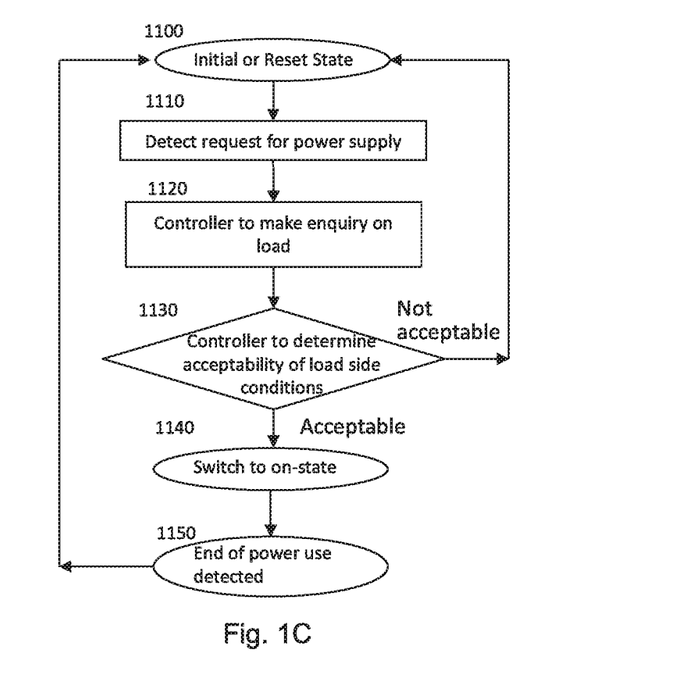
FIG. 1C is a flow diagram depicting an example flow of operations of the example the power supply control device of FIG. 1A.

Referring to FIG. 1C, the power supply control device 100 is set in the standby mode when at an initial state 1100. At 1110, the controller 142 operates to monitor conditions on the load side L and determine whether a request for power supply condition has occurred. If a request for power supply condition has occurred and is detected by the controller 142, the controller 142 will at 1120 make enquiries to the load side to investigate whether the load on the load side is an admissible or acceptable load. To make the enquiries, the controller 142 will send one or more enquiry signals to the load side and await response signals from the load side L. At 1130, the controller will upon receipt of response signals of the load side determine whether the load connected to the load side is an admissible or acceptable load. If the load is found to be unacceptable or non-admissible, the controller 142 will refuse power supply to the load and return to the initial state and the power switching device SW1 is maintained in the off-state 1100. Alternatively, if the load is found to be admissible or acceptable, the controller 142 will at 1140 operate to switch on the power switching device SW1 to supply power to the load side L. When a power use cycle has ended at 1150, the controller will reset the power supply control device 100 to the initial state 1100 and await the next request for power supply. As an option, the controller 142 may operate to generate an alarm to alert users that the load is not-admissible or not-acceptable.

To determine whether there is a request for power supply condition on the load side, the controller 142 may continuously monitor the load side L and determine whether a change in electrical property representing a request for power supply condition has occurred on the load side L. For example, a sudden drop in load side impedance, indicating a switching on of a load on the load side, or connection of a switched-on load to the load side, may be taken as a request for power supply condition. Alternatively, a request for power supply may be made by way of a protocol communication between the controller 142 and a counterpart controller of the load. For example, protocol data of the protocol communication may be sent through the second current conduction portion P2 or by wireless transmission.

To determine whether the load on the load side is eligible, that is, admissible or acceptable for power supply, the controller will send one or more enquiry signals to the load side L and then determine whether the corresponding response signals received by the controller 142 contain information indicating eligibility of the load to receive power supply from the power source. For example, the controller 142 may send enquiry signals with an aim to determining whether the load is a target load, an acceptable load, a non-excluded load, an unacceptable load, or an excluded or prohibited load.

If the load is a target load, an acceptable load or a non-excluded load, the controller 142 may operate to switch on the power switching device SW1. Alternatively, if the load is an unacceptable load or an excluded or prohibited load, the power switching device SW1 will stay in the off-state and return to the initial state or standby state until a next request for power supply condition is detected. The controller may generate an alarm if a condition of non-admissibility or non-acceptability of load is detected, so that the load may be removed for repair or disposal, or security alerted.

To determine whether a load is eligible (that is, admissible or acceptable) for power supply, one or more eligibility criteria may be used.

An example criterion of eligibility is by way of identification enquiry. When this identification criterion is used, the controller 142 will obtain identification data of the load and check whether the identity of the load corresponds to the identity of a target load or an acceptable load. To obtain identification data of the load, the controller 142 may send a 'request for identification' by way of communication protocol to the load side and await load side response. A counterpart controller on the load connected to the load side will then send its identity data to the controller 142 and the controller will then verify acceptability. Alternatively, the counterpart controller on the load may be set to transmit identification data to the source side S upon connection or upon making a power supply request. The identification data may be sent to controller 142 the through the second current conduction portion P2 or by wireless transmission. In some embodiments, the controller 142 will determine eligibility of the target load with reference to the received identification information, for example, by determining whether the received identification information matches with identification information of a pre-stored eligible or target load.

In example embodiments, the power supply control device 100 is a built-in part of a general purpose power outlet, for example a general purpose power socket or wall outlet, the power supply control device 100 may operate to supply power to one or more eligible loads, for example, loads having identification data corresponding to particular or pre-determined electrical specifications or electrical characteristics such as power factor, current rating, voltage rating, temperature rating, safety rating, ingress protection ("IP") rating, or the like; or loads having pre-determined status, such as approval status, security status, safety status, class status, performance status, or the like. The identification criterion by way of identity matching would provide useful protection against misuse, unsafe or unauthorised use of tools, apparatus or equipment. The identification information of an admissible load or admissible loads may be pre-stored for subsequent verification at production, or may be subsequently downloaded by way of update from time to time after installation.

To obtain identification information of a target load, an acceptable load, a non-excluded load, an unacceptable load, an excluded or prohibited load, or other update data, the control device 140 may include a first communication interface COM 1 for data communication between the controller 142 and a data source via the first current conduction portion P1. To obtain identification data of a load, the control device 140 may include a second communication interface COM 2 for data communication between the load side counterpart controller and the controller 142 via the second current conduction portion P2.

Figure 2A:
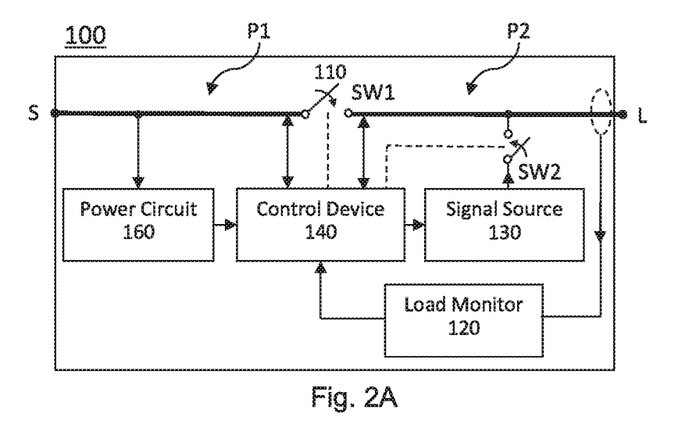
FIG. 2A is a block diagram of an example a power supply control device of the present disclosure.
Figure 2A:
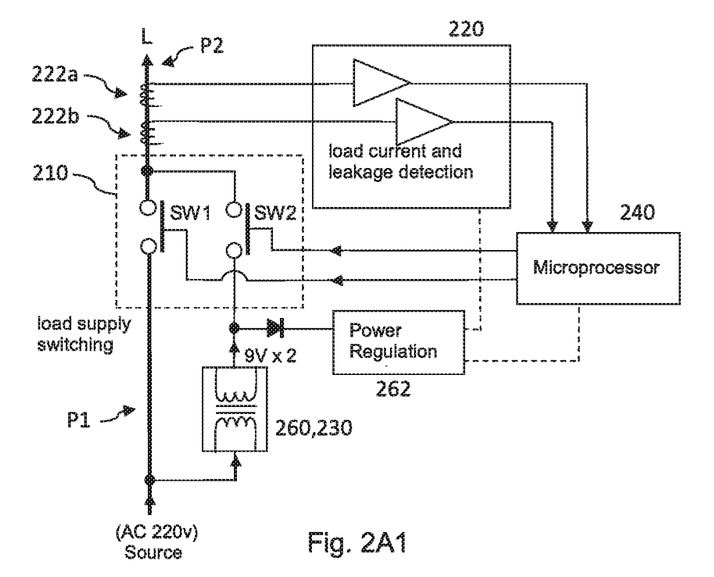
Figure 2B:
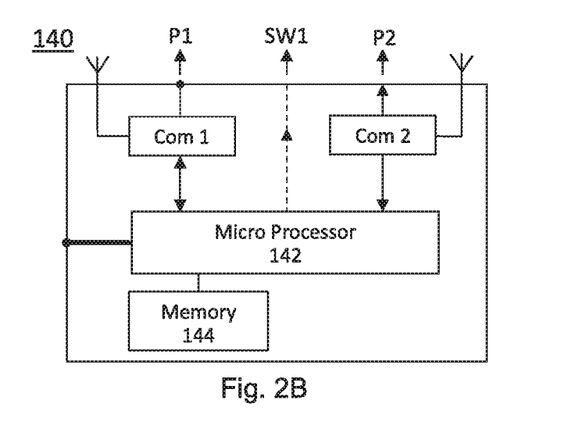
FIG. 2B is a block diagram of an example control device of the power supply control device of FIG. 2A, FIGS. 2B1 and 2B2 are schematic diagrams depicting example signal collection devices of FIG. 2A1.

The first communication interface COM 1 may comprise a power line communication ("PLC") modem to enable data communication through the first current conduction portion P1 which operate as a power supply line, or as an alternative or an additional option, by means of a wireless frontend such as a WiFi frontend, as depicted in FIG. 2B.

The second communication interface COM 2 may comprise a simple switch to facilitate direct data communication between the controller 142 and the counterpart controller on the load side L via the second current conduction portion P2, or may comprise a power line communication ("PLC") modem to enable data communication between the controller 142 and the counterpart controller on the load side L via the second current conduction portion P2, or as an alternative or an additional option, by means of a wireless frontend such as a WiFi frontend, as depicted in FIG. 2B. Where the controller 142 is required to perform pre-supply check via the second communication interface COM 2, the simple switch would suffice. Where the controller 142 is required to perform update checks via the second communication interface COM 2, for example, when power is being supplied to the load, the option of a PLC modem or a wireless frontend would be preferred for data communication since power isolation. As an example, the PLC modem may perform data communication with data modulated at say 10 kHz for transmission to the source side and at say 100 Hz or 250 Hz for transmission to the load side.

An example criterion of eligibility is by way of electrical characteristics enquiry. When this identification criterion is used, the controller 142 will obtain reference data of one or more electrical characteristics of the load and check whether the one or more electrical characteristics of the load on the load side correspond to the reference data.

In example applications of the electrical characteristics enquiry, electrical characteristics may be pre-stored in the load and retrievable by the controller 142 through cooperation with the counterpart controller of the load, for example, through data communication via the second communication interface COM 2. When a request for power supply condition has been detected, the controller 142 will operate to retrieve the pre-stored electrical characteristics from the load, for example, non-volatile memory of the load, for comparative evaluation.

In example applications, electrical characteristics of the load may be pre-stored in the own memory device 144 of the control device 140 and the controller 142 is to retrieve the pre-stored electrical characteristics for comparative evaluation when a request for power supply from the load side is detected and the identity of the load determined.

In example applications, electrical characteristics of the load are stored out of the power supply control device 100 but are retrievable by the controller 142 with reference to identification information of the load, for example, through data communication with an external data source.

The one or more electrical characteristics of the load that may be used for comparative evaluation may include: impedance, impedance-voltage variation, impedance-current variation, impedance-frequency variation, voltage-current variation, voltage-frequency variation, current-frequency variation, voltage-time variation, current-time variation, pulse response, step signal response, phase shift, time constants, or the like.

To determine the one or more electrical characteristics of the load for comparative evaluation with the reference data, the power supply control device 100 may additionally include a probing signal source 130 and a load monitor 120, as depicted in FIG. 2A. In example operations, the controller 142 is to operate the probing signal source 130 to generate probing signals and to transmit probing signals to the load side L by closing the switch SW2, for example, when the power switching device SW1 is OFF. Where the probing signal is a high frequency AC (alternate current) signal, a coupling capacitor may be connected in series with or to replace the switch SW2.

A probing signal may include one or more of: DC (direct current) voltage or current, of constant amplitude or variable amplitudes; AC voltage or current, of specific or variable frequencies and of constant amplitude or variable amplitudes; pulse signals or trains, of specific or variable periods and of constant amplitude or variable amplitudes; step signals, of specific or variable rise times and of constant amplitude or variable amplitudes. The probing source may include a sinusoidal signal generator or a signal generator which can be set to selectively generate square, sinusoidal or saw tooth probing signals without loss of generality.

The load monitor 120 is to collect responsive signals on the load side which are generated in response to the probing signals and comprises responsive signal collection devices. The responsive signal collection devices may include voltage and/or current sensing devices to collect voltage and/or current information on the load side.

Figure 2B:
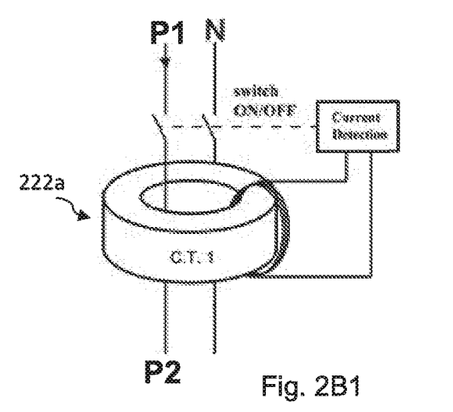
Figure 2B:
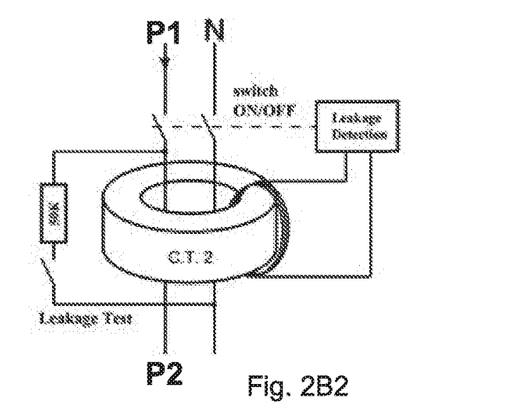
Figure 2C:
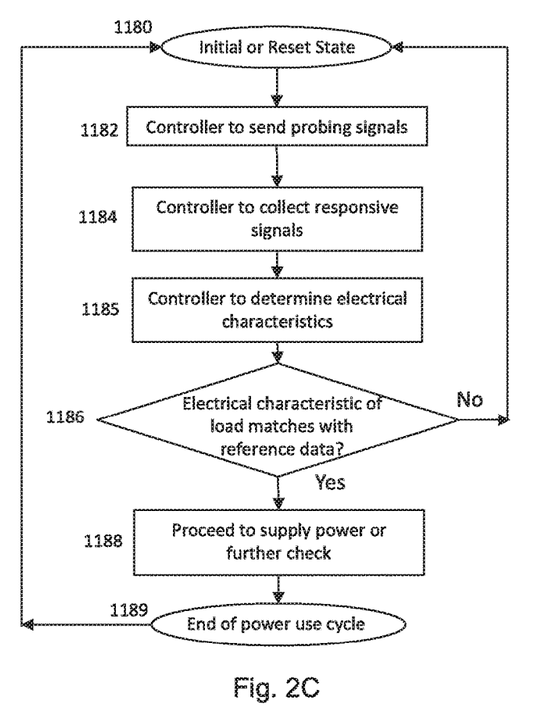
FIG. 2C is a flow diagram depicting an example flow of operations of the power supply control device of FIG. 2A.

In example operations as depicted in FIG. 2C, the controller 142 would operate the probing signal source 130 to transmit one of more probing signals or one or more types of probing signals to the load side at 1182, to collect data coming in from the load monitor 120 and representing responsive signals at 1184, to evaluate one or more electrical characteristics of the load using the collected responsive information at 1185, and to determine whether the one or more electrical characteristics of the load as determined from the collected responsive information match with the reference data of corresponding electrical characteristics at 1186. If the comparison at 1186 confirms matching, the controller 142 will close the power switching device SW1 to facilitate power flow to the load side at 1188. On the other hand, if the matching comparison fails, the controller 142 will return the power supply control device to the initial state of 1180 and maintain the power switching device SW1 in the off-state. At end of power use cycle at 1189, the controller 142 will return the power supply control device to the initial or reset state of 1180

Referring to FIG. 2A, the probing signal source 130 is for generating probing signals. The probing signal source 130 is operable to generate probing signals and is connected to the load side L by a probing signal switch SW2. The probing signal switch SW2 is switchable between a low impedance ON-state and a high impedance OFF-state. When the probing signal switch SW2 is closed, the probing signal switch SW2 is in the ON-state and probing signals generated by the probing signal source will flow to the load side L. When the probing signal switch SW2 is opened, the probing signal switch SW2 is in the OFF-state and probing signals generated by the probing signal source will not flow to the load side L.

So that the controller can obtain and process information or data to determine electrical characteristics on the load side, the controller will perform load probing operations. In example, load probing operations, the controller will operate the probing signal source to generate load probing signals to the load side and evaluate a response signal or a plurality of responsive signals received from the load side in response to the probing signal to determine one or more electrical characteristics of the load. During load probing operations, the probing signal switch SW2 is closed and the power switching device SW1 is opened, a probing signal path is established between the probing signal source 130 and the second current conduction portion P2, and probing signals generated by the probing signal source 130 flows to the load side L. During non-probing operations, the probing signal switch SW2 is opened, the probing signal path between the probing signal source 130 and the second current conduction portion P2 is disconnected to isolate the probing signal source 130 from the second current conduction portion P2, and probing signals generated by the probing signal source 130 do not flow to the load side L. In some examples, the probing signal switch SW2 can be part of the probing signal source 130.

The load monitor device 120 comprises detection circuitry which is arranged to collect electrical signals, in particular responsive signals, from the load side L. The detection circuitry may comprise signal processing circuitry such as shaping circuitry, amplification circuitry, filtering circuitry and other useful circuitry to process electrical signals collected from the load side L for subsequent output. In some embodiments, the detection circuitry may comprise decision circuitry to provide a decision output or a plurality of decision outputs upon receiving signals from the signal processing circuitry. In some embodiments, the detection circuitry comprises devices for collecting responsive signals on the load side. A responsive signal is one which is generated in response to a probing signal.

The control device 140 comprises control circuitry. The control circuitry comprises control device and/or control circuit arrangements which are arranged to manage and/or control operations of the power supply control device 100. The control circuitry may comprise a microprocessor, memory and peripheral circuitry such as input, output and control ports. The control device 140 is connected to the load monitor device 120 for receiving electrical signals originated from the load side L. The control device 140 is connected to control switching operations of both the power switching device SW1 and the probing signal switch SW2.

In example applications, the switching circuitry 110 comprising the power switching device SW1 and the probing signal switch SW2 is operatively controlled by the control device 140. For example, the control device 140 may operate or control the power switching device SW1 and the probing signal switch SW2 either individually or oppositely in synchronisation so that when one is turned on, the other is turned off. In some embodiments, the control device 140 may be connected to the probing signal source 130 to control its signal generation operations. Each of the power switching device SW1 and the probing signal switch SW2 may be implemented as solid state relays using MOSFET, thyristor or SCRs.

The power circuit 160 comprises power circuitry for supplying operation power to various components of the power supply control device 100. The power circuitry comprises power circuit arrangements such as transformers and power regulators which are arranged to supply regulated power supply to the power consuming components of the power supply control device 100 such as the load monitor device 120, the probing signal source 130 and/or the control device 140. An input of the power circuit 160 is connected to the first device side S and output of the power circuit 160 is connected to the power consuming components.

In example applications, the power supply control device 100 is connected to a power supply or a power source, with the first device side S connected to a power supply such as AC mains and the second device side L connected to a load, as depicted in FIG. 1. The load can be any electrical powered apparatus, appliance, equipment or tools. In example applications, the power supply control device 100 may be a built-in part of the power supply apparatus, for example, a general purpose power supply apparatus. In some example, the power supply control device 100 may be operated by a power source which is independent of the source side power supply.

In use, the power supply control device 100 is initially set to be in a stand-by mode. The power supply control device 100 will be subsequently set into a power operation mode when conditions on the load side L are found or determined to correspond to prescribed operation conditions or eligible admission conditions.

When in the standby mode, no current exceeding a safety threshold in time period and in amplitude is allowed to flow through the power supply control device 100 from the source side S to the load side L. To facilitate this, the power switching device SW1 is set into the OFF state when in the stand-by mode, and only to be switched into the operational mode subsequently after satisfactory determination of prescribed operation or admission conditions on the load side. When in the power operation mode, normal operational current exceeding the safety threshold time and current will be allowed to flow from the source side S to the load side L, and through the power supply control device 100. To facilitate this operation to allow flow of operational currents, the power switching device SW1 is set into the ON state when in the power operation mode.

In typical or example configurations, the power supply control device 100 is set into the standby mode each time when the power supply control device 100 is connected to an active power source and will remain in the standby mode until actuated to operate in the operational mode.

In typical or example configurations, the power supply control device 100 is reset into the standby mode after each use or completion of a cycle of power operation. A cycle of power operation means an operation current has flowed through the power supply control device 100 for a minimum operation duration and followed by a period of no operation current flow exceeding a predetermined threshold pausing period. An example threshold pausing period may be set to a few second or a few minutes.

When in the standby mode, the control device 140 will operate in a pre-power operation mode. During the pre-power operation mode, load side L electrical conditions are monitored and evaluated to determine whether there is a request for power supply condition. When a request for power supply condition has been detected, the control device 140 will operate to collect electrical signals from the load side and determine whether the collected electrical signals represent conditions of eligible admission on the load side. The pre-power operation is also referred herein as a pre-actuation mode or a monitoring mode.

In example or typical monitoring operations, the power switching device SW1 is in the OFF state, the probing signal switch SW2 is in the ON state and probing signals generated by the probing signal source will be transmitted to the load side as probing signals and to the control device 140 as reference signals. The control device 140 on evaluating the collected probing signal and upon comparison with or with respect to the reference signals would be able to determine whether electrical properties on the load side correspond to electrical properties of eligible operations.

While the power circuit 160 is connected to the source side S to obtain mains power supply for operation when in use, the power supply control device 100 may be DC operated, for example, by battery operation. Where the power supply control device 100 is DC operated, the power circuit may include DC-DC converters and/or DC-AC converters. In some applications, the power supply control device 100 may be dually both battery and mains operated without loss of generality.

An example power supply control device 200 of FIG. 2A1 comprises switching circuitry 210, a load monitor device 220, a probing signal source 230, a control device 240 and a power circuit 260. The power supply control device 200 includes the same functional components of the power supply control device 100 of FIG. 1A and the description thereon is incorporated herein mutatis mutandis where appropriate and with reference numerals increased by 100.

In the example power supply control device 200, the power circuit 260 comprises two 220v-to-9v transformers which are connected in series to form a 220v-to-18v transformer Rectified output of the transformer is voltage regulated by a power regulation arrangement 262 comprising voltage regulators. The transformer output comprises two output paths, namely, a first output path of 18v AC to serve as probing signals and a second output path connected to a full wave rectifier to supply DC power to operate components of the power supply control device 200. As shown in the circuit diagrams FIGS. 2A and 2A1, the rectified output is connected to a first voltage regulator 7808. The first voltage regulator 7808 comprises two outputs, namely, a first voltage output of 8V DC output for driving operational amplifiers (Op-amp) and a second voltage output connected to a second voltage regulator 7805 to provide a voltage output of 5V DC output for microprocessor and peripheral devices operation.

The load monitor device 120 comprises two current transformers 222a, 222b as example of signal collection devices. Connection of the current transformers 222a, 222b is depicted in more detail in FIGS. 2B1 and 2B2 Each of the current transformers 222a, 222b has a transformer ratio and rating of 5 A/5 mA.

The current transformer 222a (or first current transformer) is for detection of current flowing through the second current conduction portion P2. Although a single wire is shown in FIGS. 1 and 2, each of P1 and P2 actually comprises a live and neutral wire as depicted in FIGS. 2B1 and 2B2. The current transformer 222b (or second current transformer) is for detection of imbalanced current flowing through the second current conduction portion P2 and its associated neutral wire portion N. Hall effect transducers or other transducers may be used alternatively.

It is known that the flow of electrical current exceeding a threshold level through the human body can cause electrical shock. Electrical shock can be hazardous and known adverse consequences of electrical shock on the human body include the causing of ventricular fibrillation, respiratory arrest, nerve damage, asphyxia, and burns. Ventricular fibrillation is known to be a main cause of fatal accidents by electrical shock in mains power supply environment.

A person is able to feel the flow of current when the current flowing through the human body reaches a "perception threshold". The typical perceptible threshold for an average human body is about 1 mA at the typical mains frequency of 50 Hz or 60 Hz.

When the current flowing through the human body reaches a "let go threshold", the current flow can cause involuntary muscle contraction or tetany. When this happens, an affected person would not be able to voluntarily control muscles to release grip on a dangerously electrified object and this can result in prolonged contact with the electrified object. A prolonged exposure to a shock current at or around the let-go threshold can cause bodily damage. The typical "let go threshold" for women is between 5 mA and 7 mA and between 7 mA and 10 mA for men. For a person of 68-Kg (150-lb) weight, a typical "let go threshold" current is about 10 mA. The typical "let go threshold" for an average human body at the typical mains frequency is usually taken to be about 10 mA.

When the current flowing through the human body reaches a "ventricular fibrillation threshold", ventricular fibrillation will occur. The typical ventricular fibrillation threshold or an average human body is about 100 mA at the typical mains frequency. The actual ventricular fibrillation threshold depends on physiological parameters such as anatomy of the body, state of cardiac function, etc. as well as on electrical parameters such as duration and pathway of current flow.

Low frequency alternating current (AC) in the frequency range of between 15-100 Hz, for example at 50 Hz or 60 Hz, is considered to be more dangerous than direct current (DC) or high frequency AC, since the ventricular fibrillation threshold is considerably lower if the current flow is prolonged beyond one cardiac cycle. At these low frequencies, the let-go threshold is relatively low and the shock current can easily exceed the let-go threshold while not delivering enough initial energy to expel the person away from the source.

A current higher than the ventricular fibrillation threshold which passes through a human body can likely cause nerve or tissue damage, burns and death.

Optional safety features are incorporated in a power supply control of the present disclosure to enhance user safety and/or mitigate the risk of hazardous shock.

To enhance user safety and/or mitigate the risk of hazardous shock, variable electrical characteristics of a living body such as a human body or an animal body are utilised.

Characteristic electrical properties of a living body that are known to be variable ("variable electrical characteristics" or "variable electrical properties") include, for example:—
  a) Impedance and resistance of the human body is not constant and varies with touching voltage.
  b) Impedance of the human body is not constant and varies with frequency of touching voltage.
  c) Impedance of the human body is not constant and varies with duration of current passage.

It is further noted that i) the resistance and/or impedance of a human body decreases with increasing frequency, ii) the resistance and/or impedance of a human body decreases with increase in touch voltage, iii) the rate of decrease of impedance with increase in touch voltage frequency is dependent on the touch voltage, iv) the rate of decrease of impedance with increase in touch voltage frequency is higher for a lower touch voltage and lower for a higher touch voltage, v) touch current density at a touch voltage decreases with touch time, and vi) touch current density at a touch voltage decreases more rapidly during an initial touch and decreases at a substantially slower rate after the initial touch period. The abovementioned properties are jointly and severally referred to as "characteristic variable electrical properties of a living body" herein and each variable property is referred to as a "characteristic variable electrical property of a living body" without loss of generality.

Electrical properties of the human body are discussed in the standard document PD 6519-1: 1995 and IEC 479-1: 1994 published by the BSI (British Standards Institute) (the "IEC document"). The document, or its updates and equivalents, is incorporated herein by reference.

Although the human body is usually modelled as an RC ladder network comprising both resistive ("R") and capacitive ("C") characteristics. Because of the capacitive characteristics, the total body impedance is expected to decrease with increase in frequency. However, it is noted that the human model is not a straightforward RC ladder network in which the values of the resistive component elements and/or the values of the capacitive component elements are constant or will stay constant on contact with a touch voltage.

It is noted from Table 1 of the IEC document that the value of total body resistance decreases with increase in the magnitude of the touch voltage of the same frequency. Reported measurements have indicated that the total body resistance or impedance for the current path hand to foot is lowered than for a current path hand to hand by 10% to 30% as a reference.

It is noted from Tables 1 and 2 of the IEC that each of the value of the total body resistance and the value of the total body impedance decreases very rapidly when touch voltage of the same frequency is increased from a very low value to up to 200 volt, the rate of decrease is notably more rapid when touch voltage of the same frequency is increased from a very low value to up to 75 volt, and the rate of decrease is notably even more rapid when touch voltage of the same frequency is increased from a very low value to up to 50 volt.

It is noted that the initial body resistance and the initial body impedance of the human body is lower than the asymptotic values of Tables 1 and 2. The generally accepted initial body resistance and initial body impedance is about 500Ω. This initial body resistance limits the peak value of the current to flow through a human body at the moment when the touch voltage occurs. This initial body resistance functions to provide resistance against short pulsed shock by limiting the initial current peaks. The initial resistance Ro depends mainly on the current path and to a lesser extent on the surface area of contact. For example, at a probing voltage of 10 v, an example human average impedance at 50 Hz is about 4-8 times of that at 2 kHz; at a probing voltage of 18 v, an example human average impedance at 50 Hz is about 4.8-13 times of that at 2 kHz; at a probing voltage of 25 v, an example human average impedance at 50 Hz is about 4.4 to 13 times of that at 2 kHz. In another perspective, the average impedance of a human body at 500 Hz (at probing voltages of 10v, 18 v and 25v) is only about 35-40% of that at 50 Hz, the average impedance (at probing voltages of 10v, 18v and 25v) of a human body at 2 kHz is only about 13-15%% of that at 50 Hz and 35% of that at 500 Hz. For example, it has been observed that the average impedance (at probing voltages of 10v, 18v and 25v) at 50 Hz is about 6-8 times of the impedance at 2 kHz, the impedance at 50 Hz is about 2.5-3 times of the impedance at 500 Hz, and the impedance at 500 Hz is about 3-4 times of the impedance at 2 kHz;

For example, touch current density exhibits a sharp fall during the initial 5 to 10 seconds of touch voltage exposure and the fall is substantially slower after the initial 5 to 10 seconds. For example, the rate of fall in the first 5 seconds is at least about 4 times faster than the fall in the next 5 seconds, that is, 6-10 seconds, and 10 times faster than the rate of fall after the initial 10 seconds.

It is further noted that the total body impedance decreases very rapidly when the frequency of the same touch voltage magnitude increases from 25 Hz to 5000 Hz (or 5 kHz). The decrease is more rapid in the frequency range of 50 Hz to 2500 Hz, and even more rapid in the frequency range of 50 Hz to 1000 Hz. It is noted that the most rapid rate of change of total body impedance occurs in the region of between 50 Hz and 150 Hz. For example, a drop of about 20% is observed when the frequency increases from 50 Hz to 100 Hz (i.e., approximately 2% per Hz), a total drop of 52% is observed when the frequency increases from 50 Hz to 500 Hz (i.e., approximately 1.2% per Hz). It is also noted that the drop at below 50 Hz and the drop at above 1000 Hz is slower than the drop between 50 Hz and 1000 Hz. These trends and properties of change are observed when the touch voltages are at 10v and 25v and believed to be quite comparable for touch voltages of between 10v and 50v, or up to 100 v.

Studies have shown that for AC current of between 15 Hz and 100 Hz, a body current magnitude of below 0.5 mA is not perceptible and a body current of between 0.5 mA and a safe perceptible body current-time limit is perceptible-and-safe. The perceptible body current-time limit is 10 mA for duration of above 2 seconds and is 200 mA minus a duration dependent decrement factor for duration at or below 2 seconds. For example, the perceptible body current-time limit is 10 mA for 2 seconds and 200 mA for 10 ms. A body current time exceeding the perceptible body current-time limit may reach the "let go threshold" and become hazardous.

For DC, the trends and characteristics are somewhat similar. For example, a body current magnitude of below 2 mA is not perceptible and a body current of between 2 mA and a safe perceptible body current-time limit is perceptible-and-safe. The perceptible body current-time limit is 10 mA for duration of above 2 seconds and is 200 mA minus a duration dependent decrement factor for duration at or below 2 seconds. For example, the perceptible body current-time limit is 30 mA for 2 seconds and 200 mA for 10 ms. A body current time exceeding the perceptible body current-time limit may reach the "let go threshold" and become hazardous.

The variable electrical properties noted herein are characteristic electrical properties which can be used to determine whether there is direct electrical contact of a human body or a living body on the load side.

A power supply control device of the present disclosure can provide additional measures to facilitate determination of a hazardous condition of a living body on the load side.

Figure 3:
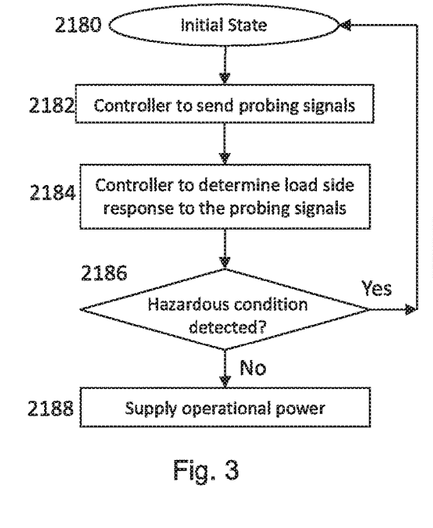
FIG. 3 is a flow diagram showing partial example flow of operation of the power supply control device.
Figure 3A:
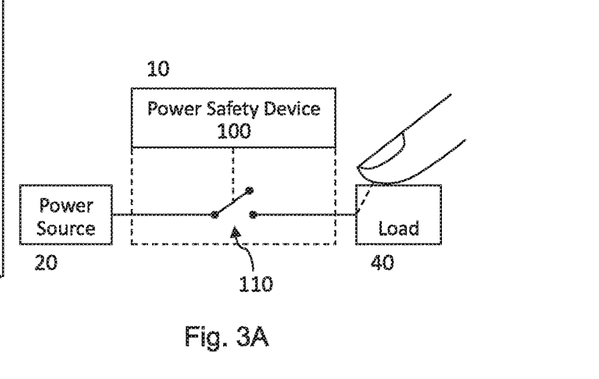
FIG. 3A is a schematic diagram depicting living body contact on the load side.

For example, the power supply control device of FIG. 2A can be adapted to detect whether there is living body on the load side and to prevent power supply if possible living body contact is detected. Referring to FIGS. 3 and 3A, a load 40 is initially connected to the power source 20 at 2180. At this stage, the power switching device SW1 is at the OFF state and no operational power will flow through the power connection circuitry. At 2182, the controller 144 sends one or more probing signals to the load side. At 2184, the controller collects responsive signals from the load side and determines electrical characteristics on the load side. At 2186, the controller determines electrical characteristics of a living body are detected. If living body is detected, the controller will not supply power and return to the initial state of 2180. If no living body is detected, the controller will proceed to 2188 to supply operation power.

For example, the flow of FIG. 3 comprising 2180 to 2188 may be optionally inserted before 1182 or 1188 of FIG. 2C, or before 1110 or 1140 of FIG. 1C.

In this application, the controller is to operate to transmit at least one type of probing signal to the load side when the power connection circuitry is in the off-state, and to evaluate and determine whether a response signal or a plurality of response signals from the load side contains at least one of a plurality of human characteristic responses indicative of direct electrical contact of a human body or a living body on the load side. The controller is to operate to switch the power connection circuitry from the off-state to the on-state if the responsive signals are determined to containing no indication or no reasonable indication of direct human or animal body contact on the load side.

One or more human body electrical properties, that is, characteristic variable electrical properties of a living body, and the associated characteristics may be used to determine whether the load side is safe. For example, one or more load side electrical properties and/or characteristics may be measured and/or determined to identify whether there is any characteristic electrical property indicative of living body contact:

Initial resistance on the load side (or load side resistance). The initial resistance may be measured or determined by applying a DC probing voltage on the load side and measuring the DC current response from the load side, or by applying a DC probing current on the load side and measuring the DC voltage response from the load side.

Initial impedance on the load side (or load side impedance). The initial impedance may be measured or determined by applying an AC probing voltage on the load side and measuring the AC current response from the load side, or by applying an AC probing current on the load side and measuring the AC voltage response from the load side.

Load side resistance change with change in DC voltage magnitude. The load side resistance change may be determined by applying a DC probing voltage of different voltage magnitudes to the load side and by measuring the DC current responses on the load side, or by applying a DC probing current of different current magnitudes to the load side and by measuring the DC voltage responses from the load side.

Load side impedance change with change in AC voltage magnitude. The load side impedance change with change in AC voltage magnitude may be determined by applying an AC probing voltage of the same frequency at different voltage magnitudes to the load side and by measuring the AC current responses on the load side, or by applying an AC probing current of the same frequency and different current magnitudes to the load side and by measuring the AC voltage responses from the load side.

Load side impedance change with change in AC frequency. The load side impedance change with change in AC frequency may be determined by applying an AC probing voltage of a constant voltage magnitude at different frequencies to the load side and by measuring the AC current responses on the load side, or by applying an AC probing current of a constant current magnitude at different frequencies to the load side and by measuring the AC voltage responses on the load side.

The load side electrical properties and/or characteristics of (a) to (e) above can be determined, for example, by applying an probing voltage of a plurality of voltage magnitudes at a plurality of frequencies (from DC to a selected upper AC frequency) to the load side and by measuring the corresponding DC and AC current responses on the load side, or by applying an AC probing current of a plurality of current magnitudes at a plurality of frequencies to the load side and by measuring the corresponding DC and AC voltage responses on the load side.

The load side electrical properties and/or characteristics obtained are then compiled and evaluated to determine whether there is a good likelihood of human body or living body direct contact on the load side. The determination may be with reference to one or more human body electrical properties or the associated characteristics.

The probing current may be selected to be one that is non-perceptible. The probing current may be selected to be one that is perceptible-and-safe. A perceptible-and-safe probing current would provide indication to a user of potential electrical shock hazard of the load. Where a larger probing current is required or preferred, the probing current may be selected to be in the perceptible-and-safe region or between the perceptible-and-safe limit and the "let go threshold". The probing signal source may include a current source or a current limiter to control the probing current magnitude.

To facilitate measurements of change with respect to change in frequency, the probing signal source would comprise a signal generator to generate AC probing signal. For example, the probing signal source may comprise a signal generator to generate AC probing signals of a plurality of frequencies. The probing signal frequency may span across a wide spectrum in order to assist observation of noticeable changes. For example, the frequency range may between DC to 10 kHz, DC to 51<z, or DC to 2.5 Hz. A plurality of discrete AC frequencies may be used as probing frequencies, for example, 25 Hz, 50 Hz, 60 Hz, 100 Hz, 200 Hz, 500 Hz, 1 kHz, or 2 kHz. In an example, a set of probing frequencies comprising 50 Hz, 500 Hz and 2 kHz is used. The probing frequencies may be selected to define or correspond to regions of different electrical properties, for example, different rates of change of electrical properties characteristic of a human or a living body when subject to electrical touch.

For example, the probing frequencies may be selected to define or correspond to regions of slow change, medium change, and rapid change characteristics of a human or a living body. The measured properties are then compared with corresponding characteristics of a human or a living body to determine whether there is a reasonable likely of human body contact on the load side.

The probing voltage may be selected to correspond to a probing current which is non-perceptible to human. The probing voltage may be selected to correspond to a probing current which is perceptible-and-safe. Where a larger probing current is required or preferred, the probing voltage may be selected to correspond to a probing current which is in the perceptible-and-safe region or between the perceptible-and-safe limit and the "let go threshold". The probing signal source may include a voltage source and/or a current limiter to control the probing current magnitude to the load side.

The resistance or impedance of an electrical current path comprising a human body in series with a power supply can range from a minimum of around 500Ω to 800Ω to several hundred kΩ (kilo-ohm) or multiple MΩ or mega-ohm, depending on various factors such as insulation state of the human body.

In order to devise useful probing signals in light of the wide range of possible human body resistance or impedance values, probing signals of an adequate magnitude that would result in noticeable responses from the load side would be useful. In order that the probing signals, for example, probing voltage or probing current, can have a sufficiently large magnitude but is still safe to a human user, the probing signal source may be an adaptive signal source which is to generate probing signals of a magnitude or magnitude according to the load side electrical conditions.

In some examples, a safe probing voltage that would result in a safe probing current may be used, for example, initially when determining initial body impedance or initial body resistance. It is noted that a probing voltage which is between 10v to 36v is a reasonably safe probing voltage range, at least initially when the human body resistance or impedance values is not known. In some examples, a plurality of probing voltages selected within the safe probing voltage range is used. For example, to determine the initial resistance and impedance, and/or their change in response to change in voltage and frequency. In some examples, probing voltages of 10V, 15v and 25v are selected to provide a large or sufficient difference in probing voltages within the safe probing voltage range.

In some example, the probing signal is in the form of a square pulse train. A probing signal comprising a train of square pulses is advantageous since a square wave is easier to generate and comprises a plurality of signal frequencies of different magnitudes so that a single train of square probing pulses can be used to replace a plurality of probing signals of different frequencies and/or different magnitudes.

To utilise the voltage responsive variation properties, the probing signal source may set to transmit a probing signal comprising a plurality of probing voltages and the collected responsive signals are analysed to determine whether the trend of the responsible signals is consistent with the expected trend of decreasing impedance and/or decreasing resistance with increasing voltage, and/or asymptotic impedance or asymptotic resistance; and/or whether the fall is within limits of expected response. In example applications, voltages of 10v, 18 v and 25V are used.

To utilise the impedance variation properties, transmit a probing signal comprising a plurality of probing frequencies and the collected responsive signals are analysed to determine whether the trend of the responsible signals fall within limits of expected response, for example, decreasing impedance with increasing frequency indicative of capacitive properties. For example, a fall of impedance value of more than 50% between 50 Hz and 500 Hz, or between 100 Hz and 1000 Hz may be indicative of human properties. In example applications, frequencies of 50 Hz, 500 Hz and 2 kHz are used.

In addition to variation properties, the probing signal may also be used to determine whether an impedance of a human body is likely to be present. For example, the human resistance is about 500Ω to 1000Ω and detection of resistance or impedance in this range may attract particular attention for further check before power is supplied.

One or a plurality of the variable characteristic electrical properties of a human or living body is utilised to help or to facilitate determination of whether there is direct electrical body contact of a human or living body on the load side. Direct electrical body contact of a human or living body on the load side is undesirable since it can result in hazardous electrical shock when the power source is strong enough. Direct electrical body contact herein includes non-insulated or bare skin contact. The characteristic electrical properties may include one that is variable or invariable in response to variation in electrical signals. Variation in electrical signals includes variation in frequency, variation in current, and variation in voltage.

The plurality of human characteristic responses may include the following variable electrical characteristics: frequency variable or frequency dependent resistance and impedance, voltage variable or voltage dependent capacitance, time variable or time dependent resistance and impedance, time variable or time dependent capacitance, time variable or time dependent current density.

The human characteristic responses include at least one of the following variable electrical characteristics: a significant or substantial decrease of resistance with an increase in probing voltage in at least a range of probing voltages, a significant or substantial decrease of impedance with an increase in probing voltage in at least a range of probing voltages, a significant or substantial decrease of resistance with an increase in probing frequency in at least a range of probing frequencies, a significant or substantial decrease of impedance with an increase in probing frequency in at least a range of probing frequencies, and a significant or substantial decrease of current or current density with increase in probing time.

The range of probing voltages may be between 10 volt and 200 volt, for example, 10 or 20 volt to 100 or 200 volt, 10 or 20 volt to 50 volt, or a range which is formed by a combination of any of the following probing voltages: 10, 15, 20, 25, 30, 35, 40, 45, 50, 55, 60 volt. Where the voltage is above say 36 volt, a shorter probing time is preferred to mitigate in advertent shock. The voltage herein may be direct current voltage or root-mean square alternating current voltage. Probing voltages of 10v, 18v and 25v are useful examples.

The probing frequency range may be a range that is between 25 Hz to 30 kHz, including 20 Hz or 25 Hz to 100 Hz, 150 Hz, or 20 kHz and 20 Hz or 25 Hz to 2 kHz, or a range which is formed by a combination of any of the following probing frequencies: 20 Hz, 50 Hz, 100 Hz, 150 Hz, 200 Hz, 300 Hz, 400 Hz, 500 Hz, 1 kHz, 1.5 kHz, 2 kHz, 2.5 kHz, 3 kHz, 5 kHz, 10 kHz, 15 kHz, 20 kHz, 25 kHz, and 30 kHz.

The probing time may have a range of between 10 ms to 1 second, between 10 ms to 100 or 200 ms or higher. For example, the probing time may extend to several seconds if there is initial doubt on whether there is living body contact. A probing time of between 20 ms to 50 ms, or 100 ms or 200 ms, is preferred for typical applications.

The human characteristic responses may include one or more of the following variable electrical characteristics: a more rapid rate of decrease of resistance and/or impedance with increasing probing voltages at lower probing voltages than higher probing voltages, a more rapid rate of decrease of impedance with increasing probing frequencies at lower probing frequencies than higher probing frequencies, asymptotic impedance for probing frequencies above 2 kHz to 5 kHz or below 25 Hz, a more rapid rate of decrease of impedance with increasing probing frequencies at lower probing voltages than higher probing voltages, and a more rapid rate of decrease of impedance in the initial 10 seconds than after the first 10 seconds.

The power supply control device may comprises a probe signal source which is operable by the controller to transmit at least one type of probing signal to the load side, and a load monitor which is to monitor a plurality of responsive signals on the load side, the responsive signals including, for example, responsive voltages and responsive currents at different times, and the controller is to operate the probe signal source to transmit the probing signal to the load side when the power connection path is in the high impedance state and to collect and evaluate responsive signals through the load monitor, the responsive signal being a signal generated on the load side in response to the probing signal.

To help determine whether there is direct bodily contact on the load side, the load side is monitored and one or a plurality of electrical signals is collected from the load side to determine whether one or a plurality of characteristic variable electrical properties of a human or living body is present on the load side. The electrical signals to be collected may be one or a plurality of responsive signals generated in the load side in response to a testing signal or a probing signal sent to the load side. The responsive signals may include a plurality of voltage signals and/or a plurality of current signals taken during the probing time.

If the one or a plurality of responsive signals contain a sign or signal indicating possible direct bodily contact of a human or living body is detected on the load side, supply of operation power to the load side is likely to be hazardous and no operation power is to be supplied to mitigate risks of electrical shock.

If the one or a plurality of responsive signals contain no sign or signal indicating possible direct bodily contact of a human or living body is detected on the load side, the risks of electrical shock is considered to be low and supply of operation power to the load side will be permitted.

In addition to detection of possible direct bodily contact on the load side, additional safe operation conditions on the load side may be detected and utilised as additional safety measures.

For example, if open-circuit or short-circuit is detected on the load side, the load side would be classified respectively as in a non-operational state and an in an un-acceptable state and no operation power will be supplied. If impedance on the load side does not correspond to or match an expected or a target impedance or impedance range where the power supply control device is for a designated, specific or target application, the load side would be classified as in an un-safe state and no operation power will be supplied.

To help determine whether one or a plurality of characteristic electrical properties of a human or living body is present on the load side, one or a plurality of testing or probing signals may be sent to the load side and one corresponding or a plurality of corresponding responsive signals are collected from the load side for evaluation and subsequent determination.

An example testing or probing signal may be one which is set to produce simulated electrical signals having a variation in electrical properties, for example, variation in signal frequency, variation in signal current, or variation in signal voltage.

The testing or probing signal is transmitted to the load side and a responsive signal generated in response to the probing signal is collected for evaluation and determination. If the collected responsive signals contain information representative of a characteristic electrical property of human bodies, there is a strong indication that direct bodily contact is likely and flow of operational current is not to be allowed.

Mains power supply (or 'mains power' or 'main supply' in short) herein means the general-purpose alternating-current (AC) electric power supply which is also known as household power, household electricity, house current, power-line, domestic power, wall power, line power, AC power, city power, street power, grid power, etc. Most mains power in the world either operate at a standard frequency of 50 Hz (Europe) or 60 Hz (US) sinusoid.

It should be appreciated that the disclosure and example herein is to facilitate better understanding and is not intended to be restrictive.

The invention claimed is:

1. A power supply control device comprising a controller and power connection circuitry operable by the controller, wherein the power connection circuitry comprises a switchable power connection path between a source side and a load side, and the power connection path is switchable to operate in a first operation state or an on-state in which state impedance between the source side and the load side is very low to permit flow of operation current through the power connection path, or a second operation state or an off-state in which state impedance between the source side and the load side is very high to impede flow of operation current through the power connection path; wherein the controller is to operate to transmit enquiry signals to the load side and to determine with reference to load side responsive signals received from the load side in response to the enquiry signals whether a load on the load side is an admissible load eligible for power supply connection and whether there is living body contact on the load side, wherein the responsive signals of an admissible load contain load identification data matched with or corresponding to reference load identification data stored in the controller or retrieved by the controller from an external data source; and wherein the controller is to switch the power connection path to the on-state or to maintain the power connection path in the on-state if the received responsive signals indicate admissibility or eligibility for power supply connection and no living body contact on the load side.

2. The power supply control device according to claim 1, wherein the enquiry signals include a load identity enquiry signal, and the controller is to transmit the load identity enquiry signal as a request for identification by way of communication protocols, and the responsive signals in response to the request for identification contain load identification information; and wherein the controller is to determine whether the load identification information is matched with reference load identification information.

3. The power supply control device according to claim 2, wherein the load identification information includes one or more of identity data, power factor, current rating, voltage rating, temperature rating, safety rating, ingress protection rating, approval status, security status, safety status, class status, or performance status.

4. The power supply control device according to claim 2, wherein the load identification information is pre-stored in the load and wherein the reference load identification information is stored in a memory device of the controller.

5. A power supply control device according to claim 2, wherein reference load identification information of target loads, acceptable loads, non-excluded loads, unacceptable loads, or prohibited loads is stored in a memory device of the controller, and the controller is to collect load identification information from the load side and to determine whether a target load or non-hazardous load is on the load side; and wherein the controller is to switch the power connection path to the on-state or to maintain the power connection path to the on-state if the responsive signals indicate connection of a target load, connection of a non-hazardous load, or connection of a non-excluded load on the load side.

6. The power supply control device according to claim 1, wherein the enquiry signals include an electrical characteristics enquiry signal, and the responsive signals to the electrical characteristics enquiry signal contain electrical characteristics of the load; and wherein the controller is to determine whether the electrical characteristics of the load are matched with reference electrical characteristics to be admissible.

7. The power supply control device according to claim 6, wherein the electrical characteristics include one or more of resistance, impedance, impedance-voltage variation, impedance-current variation, impedance-frequency variation, voltage-current variation, voltage-frequency variation, current-frequency variation, voltage-time variation, current-time variation, pulse response, step signal response, phase shift, and time constants.

8. The power supply control device according to claim 1, wherein the enquiry signals include probing signals for determining whether there are variable electrical properties indicative of living body contact on the load side, and wherein the controller is to keep the power connection path in the off-state or to switch the power connection path to the off-state if the responsive signals indicate living body contact on the load side.

9. The power supply control device according to claim 1, wherein the controller is to operate to detect or monitor receipt of a request for power supply condition when the power connection path is in the off-state, the request for power condition including detection of a sudden drop of impedance on the load side or a communication protocol request and to transmit at least one type of enquiry signals after detection of a request for power condition.

10. The power supply control device according to claim 1, wherein the power connection path comprises a first current conduction path on the source side, a second current conduction path on load side, and a power switching device interconnecting the first current conduction path and the second current conduction path; wherein the power switching device is operable in a very high impedance off-state to impede flow of operation current between the first and second current conduction paths and a very low impedance on-state to permit flow of operation current between the first and second current conduction paths; and wherein when the power switching device is in the on-state, the power connection path is in the on-state, and when the power switching device is in the off-state, the power connection path is in the off-state.

11. The power supply control device according to claim 1, wherein the power connection circuitry is initially set in the off-state and to be set into the on-state if the outcome of determination is that the responsive signal contains, embeds or carries characteristic information of a target load, an acceptable load, and/or a non-excluded load, and/or no information indicating direct bodily contact of a human body or a living body, the characteristic information comprising one or more of the following: impedance, load characteristic, identity information, of a target load, acceptable load, and/or non-excluded load.

12. The power supply control device according to claim 1, wherein the power connection circuitry is initially set in the off-state and is to maintain in the off-state if the outcome of determination is that the responsive signal contains, embeds or carries characteristic information of a non-target load, a non-acceptable load, and/or an excluded load, and/or information indicating direct bodily contact of a human body or a living body, the characteristic information comprising one or more of the following: impedance, load characteristic, identity information of a non-target load, a non-acceptable load, and/or an excluded load.

13. The power supply control device according to claim 1, wherein the controller is to switch the power connection circuitry from the on-state to the off-state if the outcome of determination is that the responsive signal contains, embeds or carries characteristic information of a non-acceptable load, an excluded load, or information indicating direct bodily contact of a human body or a living body; and wherein the characteristic information comprises one or more of the following: impedance, load characteristic, identity information of a non-acceptable load or of an excluded load.

14. The power supply control device according to claim 1, wherein the power connection circuitry is to remain in the off-state and/or to switch from the on-state to the off state if the responsive signal contains characteristic variable electrical characteristics of a living body including a human body; and wherein the characteristic variable electrical characteristics include one of more of: a significant or substantial decrease of resistance with an increase in probing voltage in at least a range of probing voltages, a significant or substantial decrease of impedance with an increase in probing voltage in at least a range of probing voltages, a significant or substantial decrease of resistance with an increase in probing frequency in at least a range of probing frequencies, a significant or substantial decrease of impedance with an increase in probing frequency in at least a range of probing frequencies, and a significant or substantial decrease of current or current density with increase in probing time.

15. A general-purpose power supply outlet apparatus comprising a power supply control device, a power inlet and a power outlet, wherein the power control device comprises a controller and power connection circuitry operable by the controller, wherein the power connection circuitry comprises a switchable power connection path between a source side and a load side, and the power connection path is switchable to operate in a first operation state or an on-state in which state impedance between the source side and the load side is very low to permit flow of operation current through the power connection path, or a second operation state or an off-state in which state impedance between the source side and the load side is very high to impede flow of operation current through the power connection path; wherein the controller is to operate to transmit enquiry signals to the load side and to determine with reference to load side responsive signals received from the load side in response to the enquiry signals whether a load on the load side is an admissible load eligible for power supply connection and whether there is living body contact on the load side, wherein the responsive signals of an admissible load contain load identification data matched with or corresponding to reference load identification data stored in the controller or retrieved by the controller from an external data source; and wherein the controller is to switch the power connection path to the on-state or to maintain the power connection path in the on-state if the received responsive signals indicate admissibility or eligibility for power supply connection and no living body contact on the load side, wherein the power inlet is connected to the source side and the power outlet is connected to the load side, and the power outlet is for receiving a standard power connector, and wherein operational power is to flow from the source side through the power connection path to the load side when the source side is connected to a power source and the power connection path is in the on-state.

16. A method of operating a power supply control device comprising a controller and power connection circuitry operable by the controller, wherein the power connection circuitry comprises a switchable power connection path between a source side and a load side, and the power connection path is switchable to operate in a first operation state or an on-state in which state impedance between the source side and the load side is very low to permit flow of operation current through the power connection path, or a second operation state or an off-state in which state impedance between the source side and the load side is very high to impede flow of operation current through the power connection path; wherein the method comprises the controller to operate:

to transmit enquiry signals to the load side and to determine with reference to load side responsive signals received from the load side in response to the enquiry signals whether a load on the load side is an admissible load eligible for power supply connection and whether there is living body contact on the load side, wherein the responsive signals of an admissible load contain load identification data matched with or corresponding to reference load identification data stored in the controller or retrieved by the controller from an external data source; and to switch the power connection path to the on-state or to maintain the power connection path in the on-state if the received responsive signals indicate admissibility or eligibility for power supply connection and no living body contact on the load side.

17. The method according to claim 16, wherein the enquiry signals include a load identity enquiry signal, and the controller is to transmit the load identity enquiry signal as a request for identification by way of communication protocols, and the responsive signals in response to the request for identification contain load identification information; and wherein the controller is to determine whether the load identification information is matched with reference load identification information.

18. The method according to claim 17, wherein the enquiry signals include an electrical characteristics enquiry signal, and the responsive signals to the electrical characteristics enquiry signal contain electrical characteristics of the load; and wherein the controller is to determine whether the electrical characteristics of the load are matched with reference electrical characteristics to be admissible.

19. The method according to claim 18, wherein the electrical characteristics enquiry signal are pulse signals, step signals, square signals, sinusoidal signals or saw tooth signals; and wherein the electrical characteristics enquiry signal has a voltage amplitude of between 15V and 50V and a frequency of between 20Hz to 150Hz.

20. The method according to claim 19, wherein the pulse signals, step signals, square signals are DC signals.

* * * * *